United States Patent
Togami et al.

(10) Patent No.: US 8,113,723 B2
(45) Date of Patent: Feb. 14, 2012

(54) COMMUNICATIONS MODULE INTEGRATED BOOT AND RELEASE SLIDE

(75) Inventors: Chris K. Togami, San Jose, CA (US); Tat Ming Teo, Singapore (SG); Frank J. Flens, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 207 days.

(21) Appl. No.: 12/685,916

(22) Filed: Jan. 12, 2010

(65) Prior Publication Data
US 2011/0081114 A1 Apr. 7, 2011

Related U.S. Application Data

(63) Continuation-in-part of application No. 12/573,637, filed on Oct. 5, 2009.

(60) Provisional application No. 61/257,776, filed on Nov. 3, 2009, provisional application No. 61/262,049, filed on Nov. 17, 2009.

(51) Int. Cl.
*G02B 6/36* (2006.01)
*H04B 10/00* (2006.01)

(52) U.S. Cl. ............... 385/86; 385/87; 385/53; 385/55; 385/56; 385/69; 385/75; 385/88; 385/92; 398/135; 398/136; 398/137; 398/138; 398/139

(58) Field of Classification Search .............. 385/53–94; 398/135–139
See application file for complete search history.

(56) References Cited

U.S. PATENT DOCUMENTS

| | | | |
|---|---|---|---|
| 5,214,730 A | 5/1993 | Nagasawa et al. | |
| 5,619,604 A * | 4/1997 | Shiflett et al. | 385/59 |
| 5,743,785 A | 4/1998 | Lundberg et al. | |
| 6,085,003 A | 7/2000 | Knight | |
| 6,848,836 B2 * | 2/2005 | Ueda et al. | 385/78 |
| 6,886,988 B2 | 5/2005 | Brown et al. | |
| 2003/0048996 A1 * | 3/2003 | Lowe et al. | 385/81 |
| 2006/0262026 A1 | 11/2006 | Gainey et al. | |
| 2009/0290619 A1 | 11/2009 | Flens et al. | |
| 2010/0080518 A1 | 4/2010 | Teo et al. | |

FOREIGN PATENT DOCUMENTS

| | | |
|---|---|---|
| EP | 0439939 | 9/1995 |
| JP | 09-171127 | 6/1997 |
| WO | 2009143293 | 11/2009 |

OTHER PUBLICATIONS

Chris Togami et al., Simplified and Shortened Parallel Cable, U.S. Appl. No. 12/717,352, filed Mar. 4, 2010.
Tat Ming Teo et al., Latching Mechanism for a Module, U.S. Appl. No. 12/573,637, filed Oct. 5, 2009.
Chris Togami et al., Electromagnetic Radiation Containment in an Optoelectronic Module, U.S. Appl. No. 12/629,650, filed Dec. 2, 2009.
The International Search Report and The Written Opinion of The International Searching Authority, International Application No. PCT/US2009/044740, date of mailing Jun. 7, 2010.

* cited by examiner

*Primary Examiner* — Brian M. Healy
*Assistant Examiner* — Guy Anderson
(74) *Attorney, Agent, or Firm* — Maschoff Gilmore & Israelsen

(57) ABSTRACT

One embodiment includes an integrated boot and release slide having a release slide and a boot. The release slide includes a main body, a plurality of arms, and a plurality of coupling structures. The arms extend from a first end of the main body. The coupling structures extend from a second end of the main body opposite the first end. The boot is overmolded over the coupling structures of the release slide and defines a cavity configured to slidably receive a communications cable.

20 Claims, 14 Drawing Sheets

COMMUNICATIONS MODULE INTEGRATED BOOT AND RELEASE SLIDE

CROSS-REFERENCE TO RELATED APPLICATIONS

This application claims the benefit of and priority to U.S. Provisional Patent Application Ser. No. 61/257,776, entitled "ELECTROMAGNETIC RADIATION CONTAINMENT IN AN OPTOELECTRONIC MODULE," filed on Nov. 3, 2009, and U.S. Provisional Patent Application Ser. No. 61/262,049, entitled "ELECTROMAGNETIC RADIATION CONTAINMENT IN AN OPTOELECTRONIC MODULE," filed on Nov. 17, 2009. This application is also a continuation-in-part of U.S. patent application Ser. No. 12/573,637, entitled "LATCHING MECHANISM FOR A MODULE," filed on Oct. 5, 2009. The foregoing patent applications are hereby incorporated herein by reference in their entirety.

BACKGROUND

1. Field of the Invention

Embodiments relate generally to communications modules. More particularly, example embodiments relate to an integrated boot and release slide for use in the insertion and removal of a communications module from a cage of a host device.

2. Related Technology

Communication modules, such as electronic or optoelectronic transceiver or transponder modules, are increasingly used in electronic and optoelectronic communication. Some modules are pluggable, which permits the module to be inserted into and removed from a cage of a host device, such as a host computer, switching hub, network router, or switch box. Some host devices include multiple cages and can therefore accommodate multiple modules simultaneously. Each module typically communicates with a printed circuit board of the host device by transmitting and/or receiving electrical data signals to and/or from the host device printed circuit board. These electrical data signals can also be transmitted by the module outside the host device as optical and/or electrical data signals.

Active cables include communication cables with communications modules at one or both ends of the communications cables. The communications modules of some active cables include a handle that is epoxied to the communications cable. Such communications modules may be removed from host device cages by pulling on the handle. If the epoxy is defective, the handle may dislodge from the communications module, making it difficult to remove the communications module from the host device cage. Further, the force applied to the handle may be difficult for a user to control when the handle dislodges from the communications module such that the user may inadvertently bend the communications cable beyond its acceptable bend radius, possibly ruining the communications cable and the entire active cable.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Some embodiments relate to an integrated boot and release slide for use in the insertion and removal of a communications module from a cage of a host device.

One example embodiment includes an integrated boot and release slide having a release slide and a boot. The release slide includes a main body, a plurality of arms, and a plurality of coupling structures. The arms extend from a first end of the main body. The coupling structures extend from a second end of the main body opposite the first end. The boot is overmolded over the coupling structures of the release slide and defines a cavity configured to slidably receive a communications cable.

Another example embodiment includes a communications module having a housing and an integrated boot and release slide. The housing includes a top shell and a bottom shell. The integrated boot and release slide includes a release slide and a boot. The release slide includes a main body, a plurality of arms, and a plurality of couplings structures. The main body includes a hollow cylinder substantially enclosing at least a portion of one end of the bottom shell. The hollow cylinder has a substantially rectangular cross-section. The arms extend from a first end of the main body along opposing sides of the housing. The coupling structures extend from a second end of the main body opposite the first end of the main body. The boot is overmolded over the plurality of coupling structures of the release slide and defines a cavity configured to slidably receive a communications cable.

Yet another example embodiment includes an active cable having a communications cable and first and second communications modules. The communications cable includes one or more optical fibers and has first and second ends to which the communications modules are attached. Each communications module includes a housing and an integrated boot and release slide. The housing includes a top shell and a bottom shell. The integrated boot and release slide includes a release slide and a boot. The release slide includes a main body, a plurality of arms, and a plurality of couplings structures. The main body includes a hollow cylinder substantially enclosing at least a portion of one end of the bottom shell. The hollow cylinder has a substantially rectangular cross-section. The arms extend from a first end of the main body along opposing sides of the housing. The coupling structures extend from a second end of the main body opposite the first end of the main body. The boot is overmolded over the plurality of coupling structures of the release slide and defines a cavity configured to slidably receive a communications cable.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION

Figure 1A:
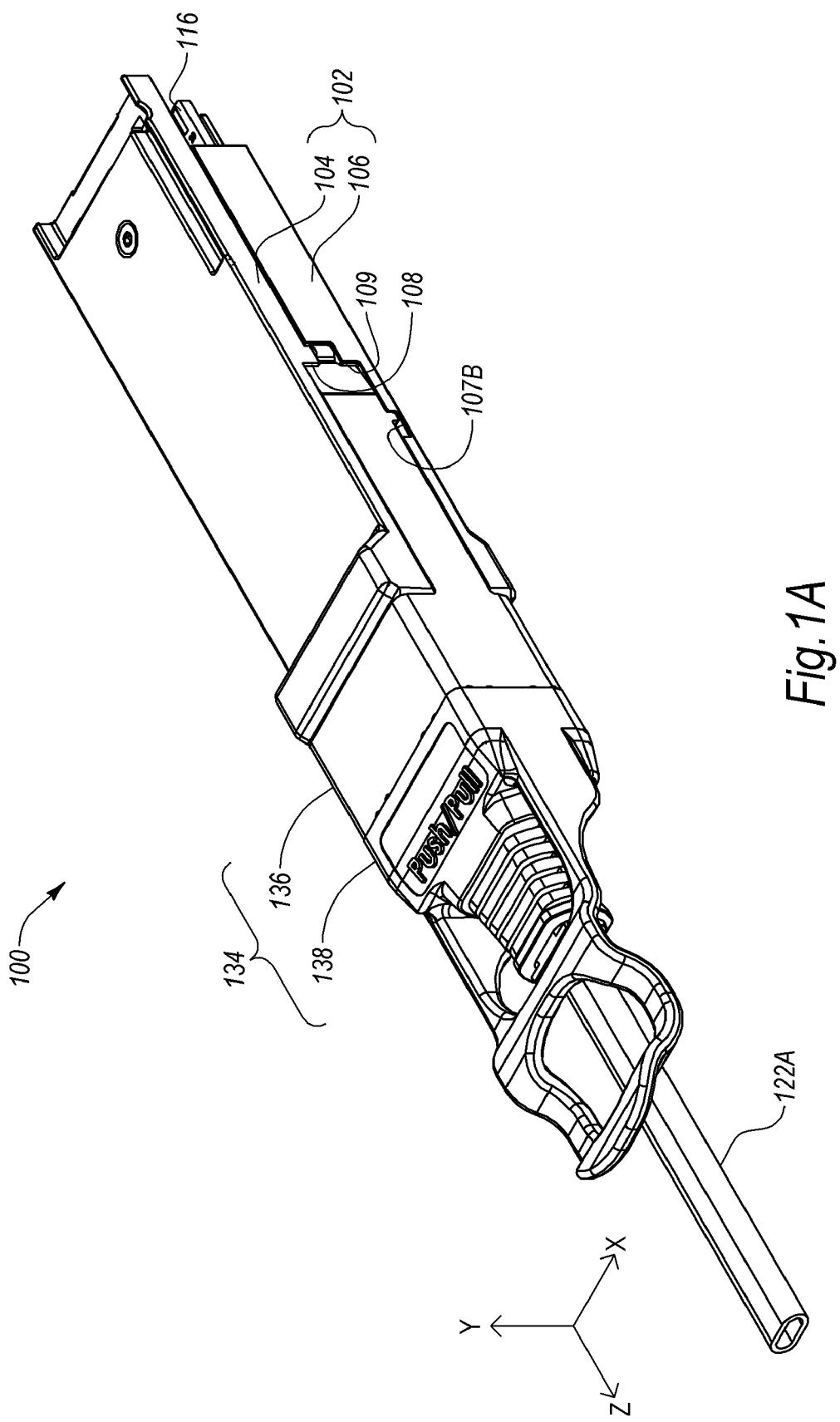
FIG. 1A is a front perspective view of an example communications module and an attached communications cable illustrating an example boot and example release slide forming an integrated boot and release slide.

Example embodiments of the invention relate to an integrated boot and release slide for use in inserting and removing a communication module from a cage of a host device. Some example embodiments of the integrated boot and release slide include a boot and a release slide. The release slide includes a main body, a plurality of arms extending from a first end of the main body for selectively securing the communication module within the cage, and a plurality of coupling structures extending from a second end of the main body. The boot is overmolded over the coupling structures of the release slide. The boot defines a cavity configured to slidably receive a cable.

In some embodiments, the overmolding of the boot over the coupling structures of the release slide substantially prevents the boot from being dislodged from the communication module when a force is applied to the boot to remove the communication module from the cage. Alternately or additionally, the boot includes an integrated pull tab upon which a force is applied to remove the communication module from the cage.

The embodiments described herein can be implemented in various communication modules, including electronic modules and optoelectronic modules. As used herein, the term "optoelectronic module" includes modules having both optical and electrical components. Examples of electronic and optoelectronic modules include, but are not limited to, active electrical cables, active optical cables, transponders, transceivers, transmitters, and/or receivers. Electronic and optoelectronic modules can be used, for instance, in telecommunications networks, local area networks, metro area networks, storage area networks, wide area networks, and the like and can be configured to conform with one or more standardized form factors or multi-source agreements ("MSAs"), including the QSFP, CXP, CFP, XFP and SFP+ form factors, without restriction. It will be appreciated, however, that the electronic and optoelectronic modules need not comply with standardized form factor requirements and may have any size or configuration necessary according to a particular design.

The communication modules according to some embodiments can be configured for electrical and/or optical signal transmission and reception at a variety of per-second data rates including, but not limited to, 10 Gigabits per second ("G"), 40 G, 100 G, or higher. As used herein, the terms "10 G", "40 G", "100 G", and similar terms represent rounded approximations of common signaling rates and have the meanings commonly understood by those of skill in the art.

Furthermore, the communication modules according to some embodiments can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the communication modules can be configured to support various transmission standards including, but not limited to, Ethernet, Fibre Channel, Infiniband and SONET/SDH.

Reference will now be made to the drawings wherein like structures will be provided with like reference designations. It should be understood that the drawings are diagrammatic and schematic representations of exemplary embodiments and, accordingly, are not limiting of the scope of the present invention, nor are the drawings necessarily drawn to scale.

I. First Example Module

Figure 1B:
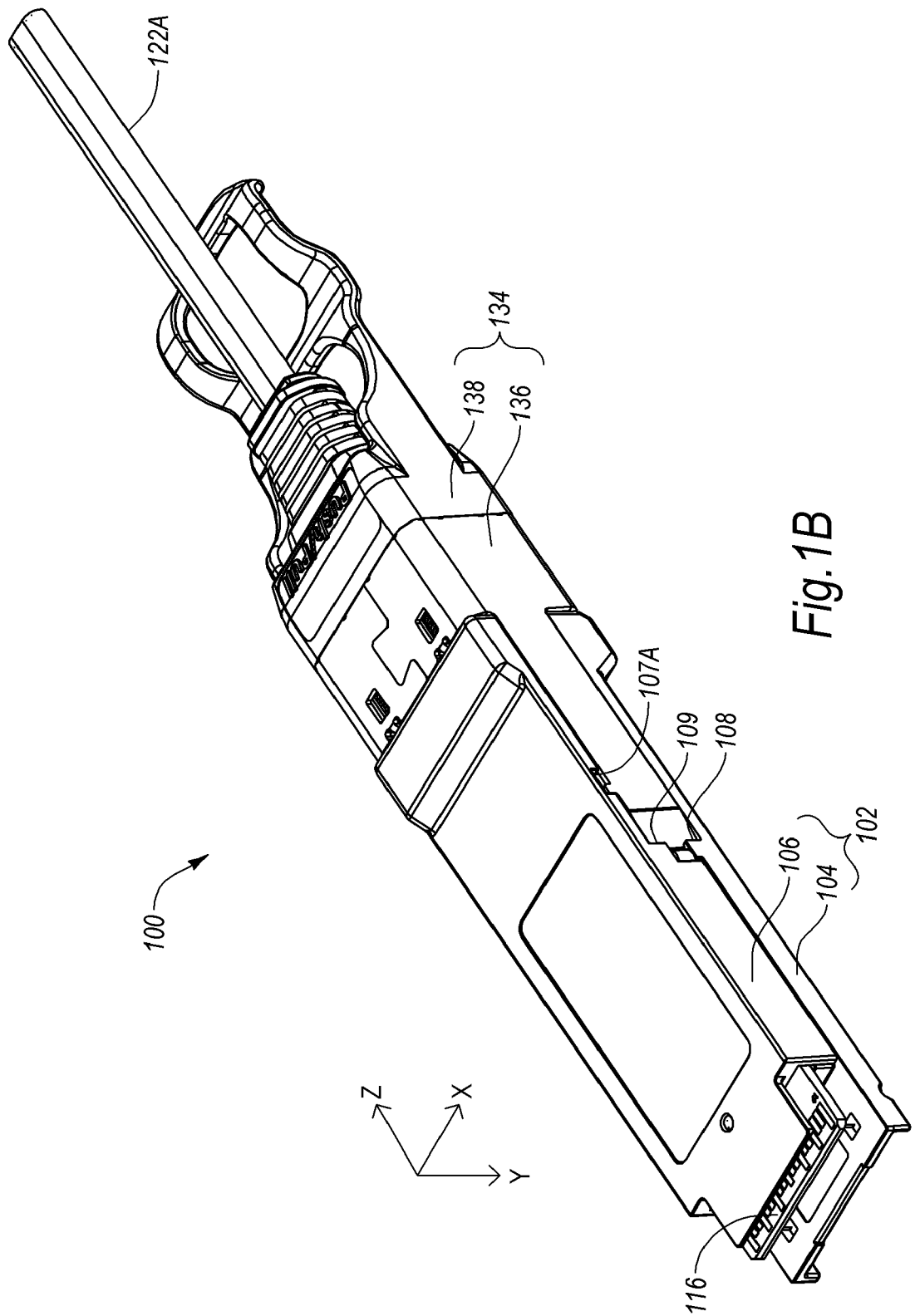
FIG. 1B is a bottom rear perspective view of the example communications module and attached communications cable of FIG. 1A.
Figure 1C:
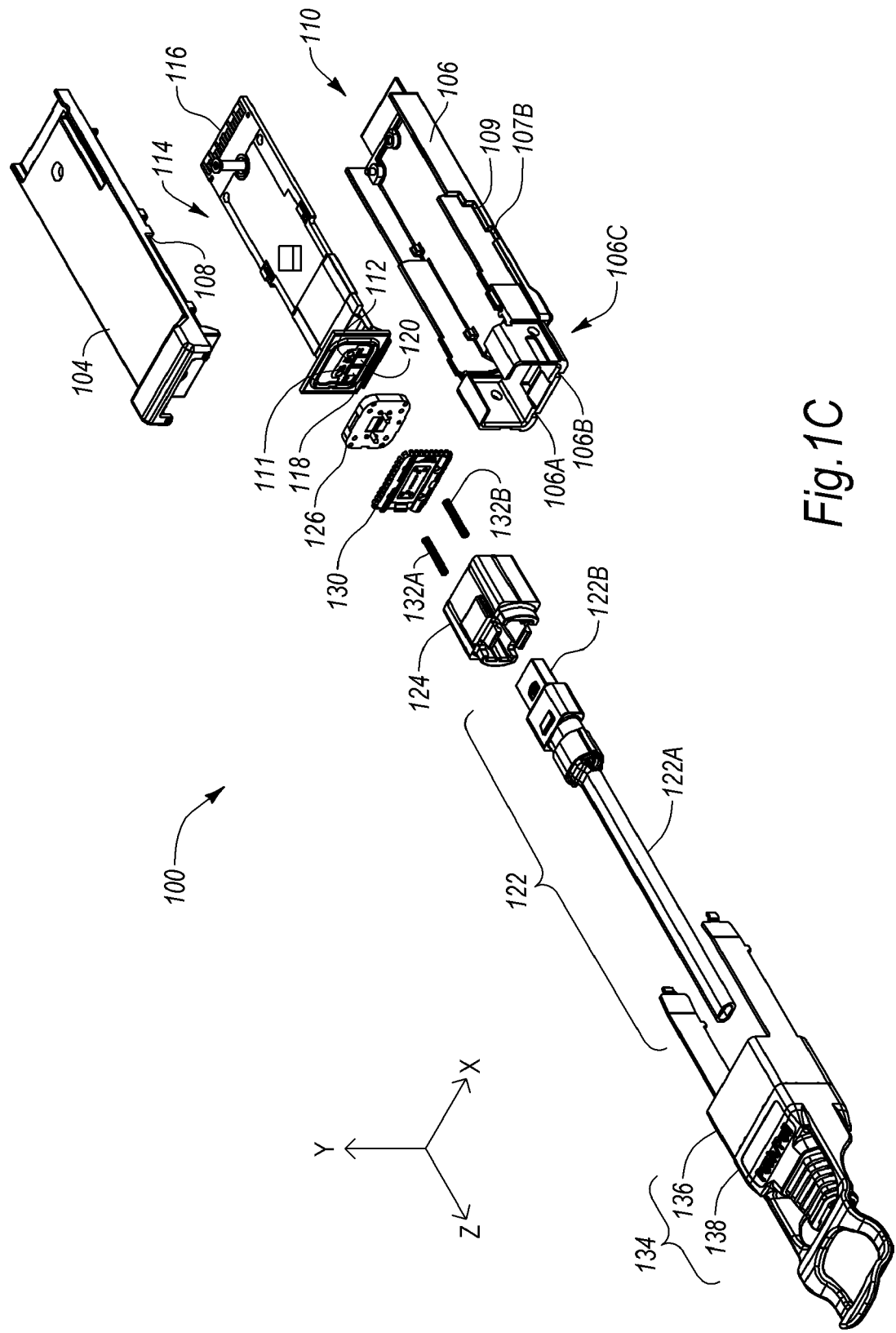
FIG. 1C is an exploded front perspective view of the example communications module and attached communications cable of FIG. 1A.

Reference is first made to FIGS. 1A-1C which depict an example communication module 100 ("module 100") for use in transmitting and receiving optical signals in connection with a host device (not shown) that is operatively connected in some embodiments to a communication network (not shown). FIGS. 1A-1C illustrate, respectively, a front perspective view, a bottom rear perspective view, and an exploded front perspective view of the module 100.

As illustrated in FIGS. 1A-1C, the module 100 includes a housing 102 made up of a top shell 104 and a bottom shell 106. Although the housing 102 is illustrated as being made up of two components (i.e., top shell 104 and bottom shell 106), the housing 102 can alternately be made up of a unitary component and/or three or more components.

In the example depicted in FIGS. 1A-1C, the bottom shell 106 includes two cutouts 107A, 107B (collectively "cutouts 107"). Additionally, a latching shoulder 108 is formed in each side of the top shell 104 (only one latching shoulder 108 is visible in FIGS. 1A-1C) and a latching shoulder 109 is formed in each side of the bottom shell 106 (only one latching shoulder 109 is visible in FIGS. 1A-1C). Additional information regarding cutouts 107 and latching shoulders 108, 109 is provided below.

As best seen in FIG. 1C, the housing 102 defines a cavity, generally indicated at 110, within which are disposed at least one optical transmitter 111 and at least one optical receiver 112. In this and other examples, the optical transmitter 111 is a 4×1 array of vertical cavity surface emitting lasers ("VCSELs") and the optical receiver 112 is a 4×1 array of p-type, intrinsic, n-type ("PIN") photodiodes. Alternately, the optical transmitter 111 can include other types of optical transmitters, such as edge-emitting lasers, in the same or different quantities or configurations. Similarly, the optical receiver 112 can alternately include other types of optical receivers in the same or different quantities or configurations. In other embodiments, the module 100 implements electrical transmitters and receivers, rather than optical transmitters 111 and receivers 112.

A printed circuit board assembly ("PCBA") 114 is at least partially disposed in the cavity 110. The PCBA 114 includes, among other things, edge connector 116, a laser driver 118, and a post amplifier 120. The edge connector 116 interfaces with a host device to communicate electrical data signals between the host device and the module 100. Electrical data signals received from the host device are provided to the laser driver 118, which drives the optical transmitter 111 to emit optical data signals representative of the received electrical data signals. Alternately or additionally, optical data signals can be received by the optical receiver 112 which converts the received optical data signals to electrical data signals and provides the electrical data signals to the post amplifier 120 for amplification prior to being communicated to the host device via edge connector 116.

With continued reference to FIG. 1C, a cable assembly 122 is provided that includes a communications cable 122A and a modified MPO-style male connector 122B. In some examples, the cable assembly 122 is permanently attached to the module 100, and thus the module 100 represents one end of an "active cable." As used herein, the term "active cable" refers to an apparatus with a module, such as the module 100, permanently attached at one or both ends of a transmission media, such as the communications cable 122A. It is understood, however, that the cable assembly 122 could instead be releasably connected to the module 100, in which case the module 100 would function as a stand-alone module.

In the example of FIGS. 1A-1C, the communications cable 122A includes a total of 12 multimode parallel ribbon fibers, including 4 transmit fibers, 4 receive fibers, and 4 unused fibers. More generally, however, the communications cable 122A includes any suitable number of single mode or multimode fibers implemented in a parallel ribbon or as individual fibers.

The modified MPO-style male connector 122B is received within a modified MPO-style female connector, known as an alignment guide 124. The alignment guide 124 partially positions the optical fibers of cable assembly 122 within the module 100. The module 100 additionally includes a lens block 126 with overmolded lens pins (not labeled). The modified MPO-style male connector 122B, alignment guide 124, lens block 126 and lens pins collectively cooperate to align the optical fibers of the cable assembly 122 with the optical transmitter 111 and optical receiver 112 such that optical signals can be emitted onto and/or received from the optical fiber(s) of cable assembly 122.

Optionally, the module 100 additionally includes an electromagnetic radiation ("EMR") containment assembly 130 and a plurality of springs 132A, 132B (collectively "springs 132"). The EMR containment assembly 130 is configured to substantially prevent EMR from escaping past the EMR containment assembly 130. The springs 132A, 132B are housed within channels 106A, 106B, respectively, formed in the bottom shell 106. Briefly, the springs 132A, 132B are configured to bias an integrated boot and release slide 134 in a non-activated position.

The module 100 further includes integrated boot and release slide 134. The integrated boot and release slide 134 includes a release slide 136 and a boot 138. The integrated boot and release slide 134 is configured for use in inserting and removing the module 100 from a cage. Additional details regarding the integrated boot and release slide 134 are provided below.

Some embodiments have been described in the context of an active optical cable including a module 100 configured to transmit and receive optical signals over an optical communications cable 122A. Alternately or additionally, embodiments can be implemented in active electrical cables including modules configured to transmit and receive electrical signals over electrical cables. Alternately or additionally, embodiments can be implemented in stand-alone modules configured to transmit and/or receive optical signals or electrical signals over suitable transmission media.

Furthermore, the module 100 illustrated in FIGS. 1A-1C is substantially compliant with the QSFP MSA. In other embodiments, the module 100 is configured to be substantially compliant with other form factors including, but not limited to, the CXP form factor.

II. Integrated Boot and Release Slide

Figure 2A:
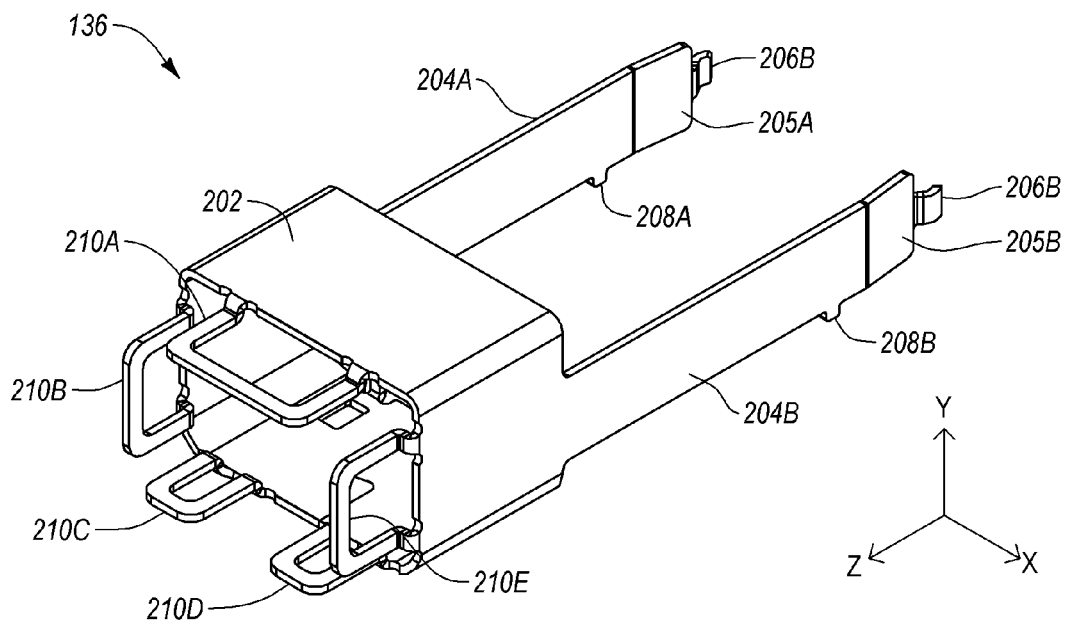
FIG. 2A is a front perspective view of the example release slide of FIGS. 1A-1C.
Figure 2B:
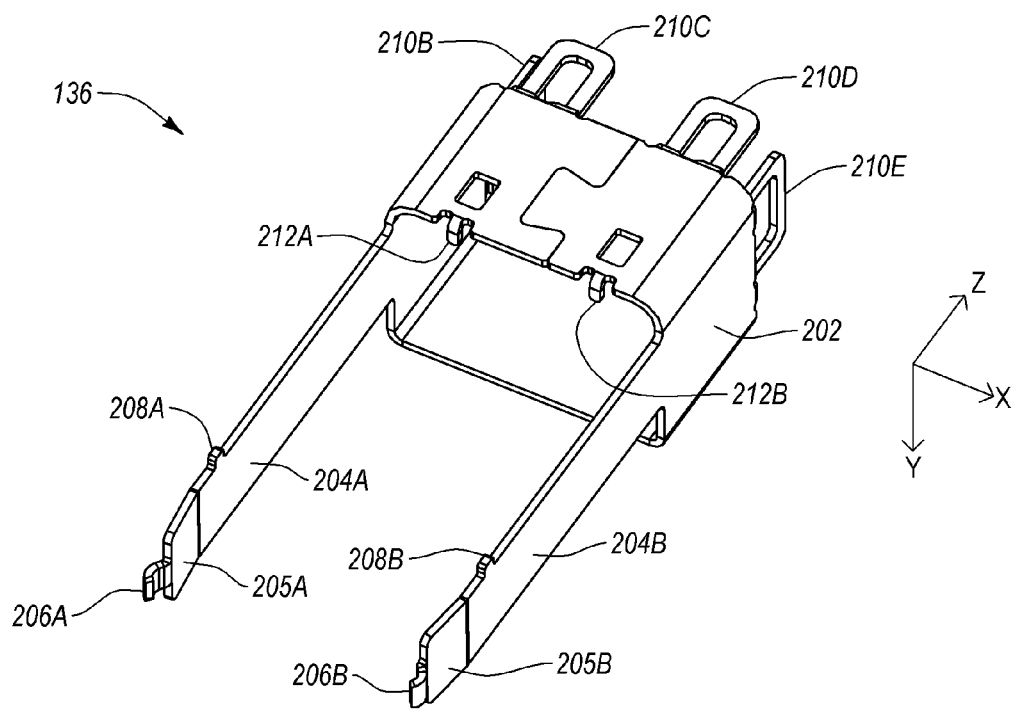
FIG. 2B is a bottom rear perspective view of the example release slide of FIG. 2A.
Figure 3A:
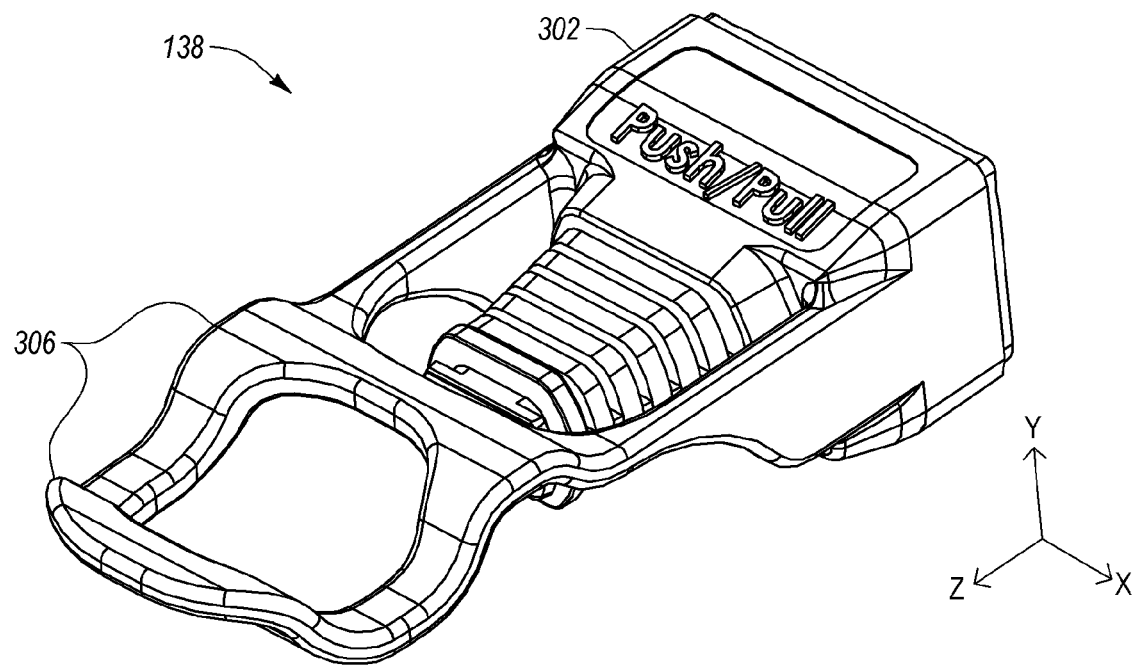
FIG. 3A is a front perspective view of the example boot of FIGS. 1A-1C.
Figure 3B:
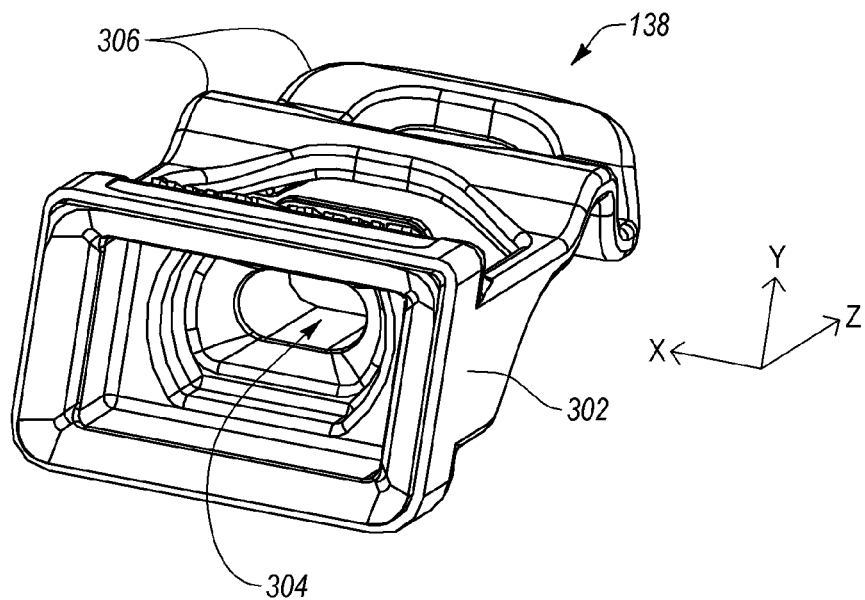
FIG. 3B is a rear perspective view of the example boot of FIG. 3A.
Figure 4:
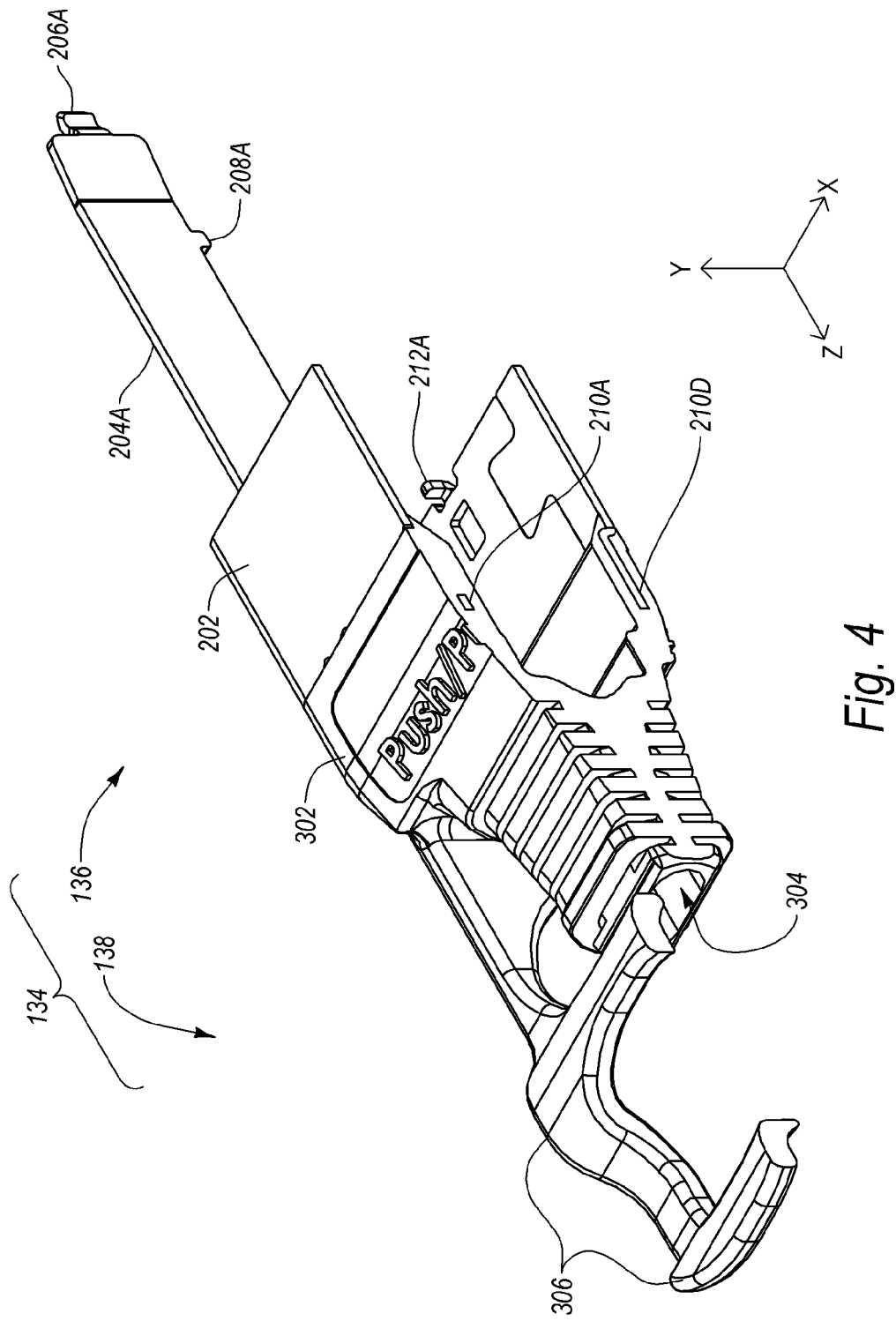
FIG. 4 is a front perspective cross-sectional view of the integrated boot and release slide of FIG. 1A.

FIGS. 2A-4 disclose additional details regarding the integrated boot and release slide 134 of FIGS. 1A-1C. In particular, FIG. 2A illustrates a perspective view and FIG. 2B illustrates a bottom rear perspective view of the release slide 136. FIG. 3A illustrates a perspective view and FIG. 3B illustrates a rear perspective view of the boot 138. FIG. 4 illustrates a cross-sectional perspective view of the integrated boot and release slide 134.

A. Release Slide

With combined reference to FIGS. 2A-2B, additional details regarding the release slide 136 are disclosed. The release slide 136 can be made of sheet metal, other metal(s), plastic, other suitable material(s), or any combination thereof. The release slide 134 includes a main body 202. The main body 202 is a hollow cylinder having a substantially rectangular cross-section in the illustrated embodiment. With combined reference to FIGS. 1A-2B, the main body 202 substantially encloses the positive z-end 106C of bottom shell 106.

A plurality of arms 204A, 204B (collectively "arms 204") extends in the arbitrarily defined negative z-direction away from a first end of the main body 202. Each of the arms 204 includes a ramp 205A, 205B (collectively "ramps 205") and a de-latch member 206A, 206B (collectively "de-latch members 206"). In some embodiments, the ramps 205 accommodate inward-directed latches of a cage, permitting the cage latches to engage one or more of latching shoulders 108, 109. Alternately or additionally, the de-latch members 206 are configured to disengage the cage latches from the latching shoulders 108, 109 upon activation of the integrated boot and release slide 134.

Each of arms 204 additionally includes a guide post 208A, 208B (collectively "guide posts 208"). With combined reference to FIGS. 1A-2B, the guide posts 208 are received in cutouts 107 of the bottom shell 106 and are configured to substantially prevent the integrated boot and release slide 134 from separating from the module 100 while permitting limited travel of the integrated boot and release slide 134 in the z-direction with respect to the housing 102. More particularly, the guide post 208A is received in cutout 107A and the guide post 208B is received in cutout 107B. The cutouts 107 are oversized in the z-direction with respect to the guide posts 208, permitting the guide posts 208 to travel a distance less than a length of each cutout 107 in the z-direction. Upon reaching the end of cutouts 107, the guide posts 208 engage the cutouts 107 and prevent the integrated boot and release slide 134 from separating from the module 100.

Returning to FIGS. 2A-2B, a plurality of coupling structures 210A-210E (collectively "coupling structures 210") extends away from the opposite end of the main body 202 as the arms 204. In the illustrated embodiment, there are five coupling structures 210. In other embodiments, there may be more or less than five coupling structures 210. Further, each of the coupling structures 210 is substantially U-shaped. Alternately or additionally, each of the coupling structures 210 has a shape other than a U-shape. The coupling structures 210A-210E are used to couple the release slide 134 and boot 138 together.

Optionally, the release slide 136 further includes a plurality of tabs 212A, 212B (FIG. 2B) extending from the first end of the main body 202. With combined reference to FIGS. 1A-2B, the tabs 212A, 212B cooperate with the springs 132A, 132B disposed in channels 106A, 106B to bias the integrated boot and release slide 134 in a non-activated position within a cage, as will be explained in greater detail below with respect to FIG. 6.

B. Boot

Turning next to FIGS. 3A-3B, additional details regarding the boot 138 are disclosed. The boot 138 can be made of rubber, plastic, sheet metal, other suitable material(s), or any combination thereof. Further, the boot 138 includes a main body 302.

As best seen in FIG. 4, the main body 302 of boot 138 is overmolded over the coupling structures 210 of the release slide 136. In particular, FIG. 4 is a perspective view of the integrated boot and release slide 134 with a cross-section through the integrated boot and release slide 134 depicting coupling structures 210A, 210D that have been overmolded by the main body 302 of boot 138. Although not visible in FIG. 4, the other coupling structures 210B, 210C, 210E of release slide 134 are also overmolded by the main body 302 of boot 138.

Accordingly, the boot 138 is coupled to the release slide 136 to form integrated boot and release slide 134 by overmolding the boot 138 over the coupling structures 210 of the release slide 136. In other embodiments, the boot 138 is coupled to the release slide 136 using welds, rivets, nuts, bolts, screws, pins, clips or other coupling means.

Returning to FIGS. 3A-3B, the boot 138 defines a cavity 304 configured to slidably receive a cable, such as the communications cable 122A of FIGS. 1A-1C. In this and other examples, the cavity 304 permits the boot 138 to slide back and forth in the z-direction along the communications cable 122A.

The boot 138 optionally includes a handle 306 that is configured to be manipulated by a user to apply a force to the boot 138. In other embodiments forces can be applied directly to the main body 302 or other areas of the boot 138. Because the boot 138 is coupled to the release slide 136 as illustrated in FIG. 4, forces applied to the boot 138 via handle 304 are transferred to the release slide 136.

C. Example Operation of the Integrated Boot and Release Slide

Figure 5A:
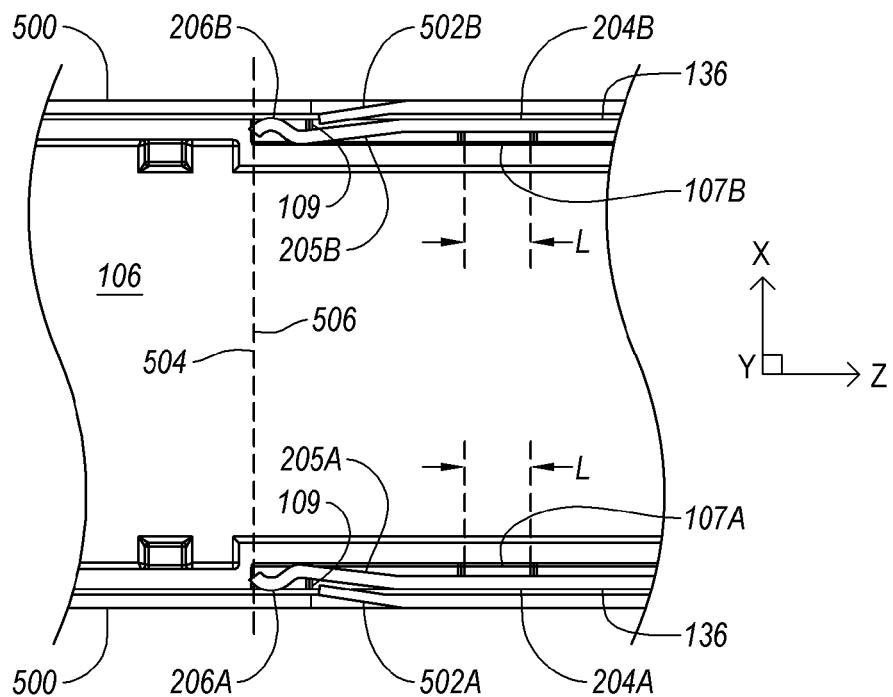
FIG. 5A is a top cross-sectional view of a portion of the example communications module and release slide of FIG. 1A with the release slide in a non-activated position.
Figure 5B:
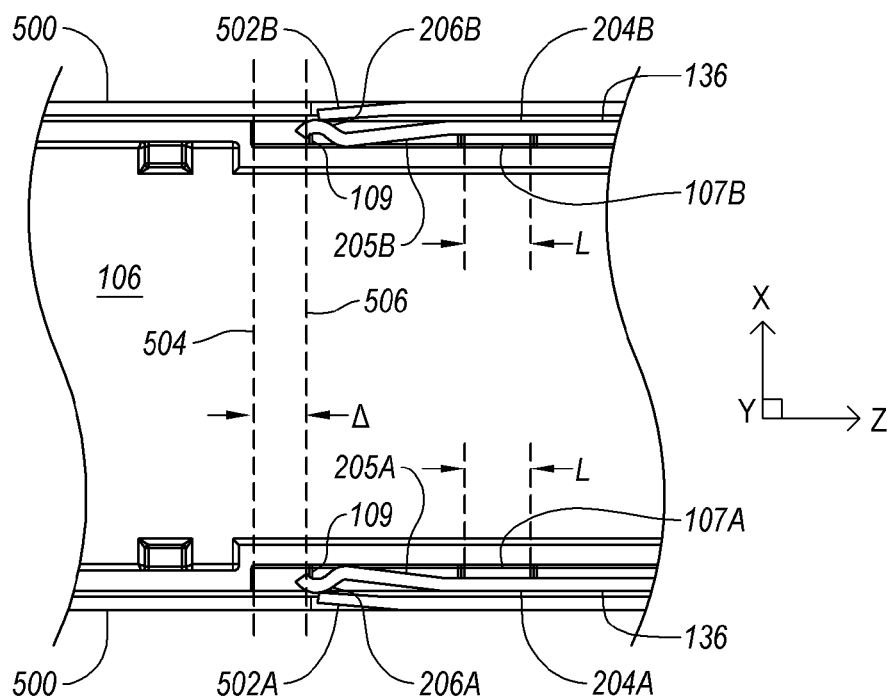
FIG. 5B is a top cross-sectional view of the portion of the example communications module and release slide of FIG. 5A with the release slide in an activated position.
Figure 6:
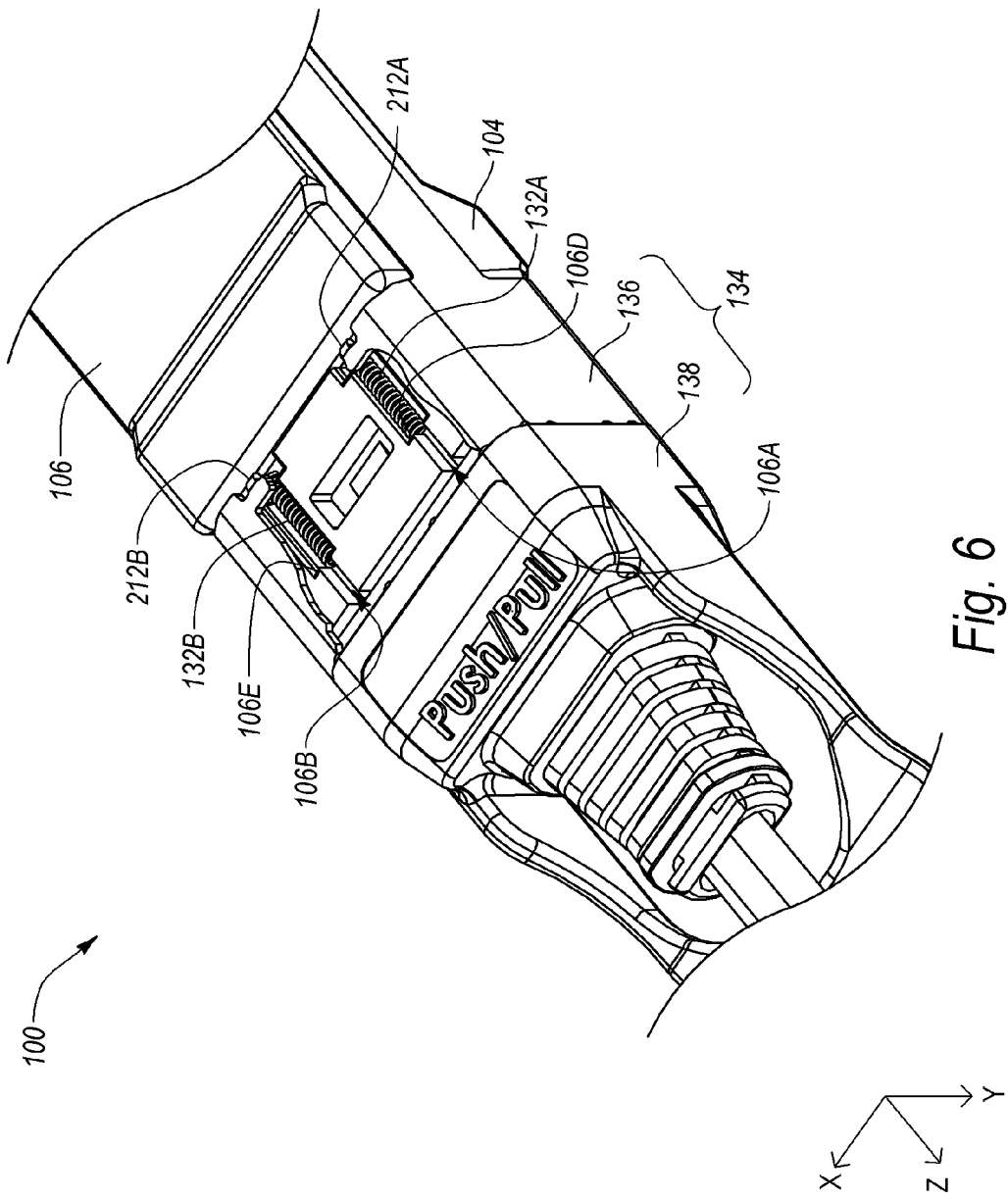
FIG. 6 is a bottom front perspective view of the communications module of FIG. 1A with a portion of the release slide removed.

Turning next to FIGS. 5A-6, aspects of the operation of the integrated boot and release slide 134 are disclosed. FIG. 5A illustrates a partial cross-sectional view of the bottom shell 106 and release slide 136 with the release slide 136 in a non-activated position. FIG. 5B illustrates a partial cross-sectional view of the bottom shell 106 and release slide 136 with the release slide 136 in an activated position. FIG. 6 illustrates a bottom perspective view of part of the module 100 with a portion of the release slide 136 removed.

FIGS. 5A and 5B further depict a portion of a cage 500 or other host device receptacle for receiving module 100. As illustrated in FIGS. 5A-5B, the cage 500 includes cage latches 502A, 502B (collectively "latches 502") which are formed in the cage 500 and directed inward so as to engage latching shoulders 109 formed in the bottom shell 106. Alternately or additionally, latches 502 can be formed in the cage 500 so as to engage latching shoulders 108 formed in the top shell 104.

As previously mentioned, FIGS. 5A and 5B respectively depict the release slide 136 in a non-activated position and an activated position with respect to the bottom shell 106. In the present embodiment, the term "non-activated position" refers to the positioning generally illustrated in FIG. 5A where the de-latch members 206 are positioned beyond the latching shoulders 109 such that the ramps 205 permit the inward-directed latches 502 to engage the latching shoulders 109. More generally, the term "non-activated position" as applied to this and other embodiments refers to any positioning of an integrated boot and release slide in which a cage can engage a module, or vice versa.

In contrast, the term "activated position" as applied to the present embodiment refers to the positioning generally illustrated in FIG. 5B where the release slide 136 has been moved in the z-direction to align the de-latch members 206 in the z-direction with the ends of the latches 502 such that the latches 502 can disengage the latching shoulders 109. More generally, the term "activated position" as applied to this and other embodiments refers to any positioning of an integrated boot and release slide in which a cage is disengaged from a module, or vice versa.

During the alignment of the de-latch members 206 with the ends of the latches 502, the ends of the latches 502 ride over the de-latch members 206 and are displaced outward in the x-direction sufficient to clear and thereby disengage the latching shoulders 109. In this regard, the latches 502 may be made of a resilient material such that the latches 502 flex outward as the ends of the latches 502 are displaced in the x-direction by the de-latch members 206.

FIG. 5A further illustrates reference planes 504 and 506 that are both arranged normal to the z-axis. The reference plane 504 is aligned with the latching shoulders 109 and remains substantially fixed in the z-direction at least until the latches 502 are disengaged from the latching shoulders 109. The reference plane 506 is aligned with the ends of the de-latch members 206 and coincides with the reference plane 504 when the release slide 136 is in the non-activated position of FIG. 5A. However, the reference plane 506 remains fixed with respect to the release slide 136 such that the reference plane 506 moves in the z-direction when the release slide 136 is moved.

With combined reference to FIGS. 1A-1C and 5A-5B, to remove the module 100 (FIGS. 1A-1C) from the cage 500 (FIGS. 5A-5B), a force is applied to the boot 138 (FIGS. 1A-1C), the force having at least a component in the positive z-direction. Because the boot 138 is coupled to the release slide 136, when a sufficient force is exerted on the boot 138, the boot 138 and release slide 136 move in the positive z-direction until the boot 138 and release slide 136 have moved a distance Δ in the positive z-direction with respect to the bottom shell 106. The distance Δ is illustrated in FIG. 5B as the difference between reference planes 504 and 506.

In some embodiments, the distance Δ is less than or approximately equal to the length L of the cutouts 107. In this regard, the guide posts 208 (not shown in FIGS. 5A-5B) of release slide 136 are received within cutouts 107 and are configured to prevent the release slide 136 from separating from the bottom shell 106 and, in so doing, limit the length of travel of the release slide 136 with respect to the bottom shell 106 to a distance less than or equal to L.

Accordingly, as the boot 138 and release slide 136 move in the positive z-direction from the non-activated position of FIG. 5A to the activated position of FIG. 5B, the ends of the latches 502 ride over the de-latch members 206 and are displaced outward in the x-direction sufficient to clear and thereby disengage the latching shoulders 109. After the latches 502 have been disengaged from the latching shoulders 109, the module 100 can be removed from the cage 500 by the continued application of the force to the boot 138 in the positive z-direction. In some embodiments, for example, the force previously applied to activate the release slide 136 to outwardly displace and disengage the latches 502 from the latching shoulders 109 subsequently operates to remove the module 100 from the cage 500 when the latches 502 are no longer engaging the latching shoulders 109.

In this and other embodiments, the cavity 304 (FIG. 3B) defined by the boot 138 permits the boot 138 to slide along the communications cable 122A (FIGS. 1A-1C) during activation of the integrated boot and release slide 134.

Turning to FIG. 6, a portion of the release slide 136 has been removed from FIG. 6 to illustrate various aspects of the module 100. In particular, FIG. 6 illustrates the springs 132A, 132B disposed in channels 106A, 106B to bias the integrated boot and release slide 134 in a non-activated position. The channels 106A, 106B include, respectively, shoulders 106D, 106E.

The springs 132A, 132B are substantially confined in the x-direction by the channels 106A, 106B. The springs 132A, 132B are substantially confined in the y-direction by the channels 106A, 106B and the main body 202 of the release slide 136. The springs 132A, 132B are substantially confined in the z-direction by the shoulders 106D, 106E in cooperation with the tabs 212A, 212B.

Accordingly, during force application and activation of the integrated boot and release slide 134, motion of the integrated boot and release slide 134 in the positive z-direction causes the tabs 212A, 212B to compress the springs 132A, 132B against the shoulders 106D, 106E. When the applied force is removed, the compressed springs 132A, 132B expand in the z-direction against the tabs 212A, 212B and shoulders 106D, 106E to move the integrated boot and release slide 134 to the non-activated position depicted in FIG. 5A. In some embodiments, the springs 132A, 132B are partially compressed in the z-direction when the integrated boot and release slide 134 is in the non-activated position so as to ensure that the integrated boot and release slide 134 is biased into the non-activated position when no external force is being applied to the integrated boot and release slide 134.

III. Alternate Embodiments

Figure 7:
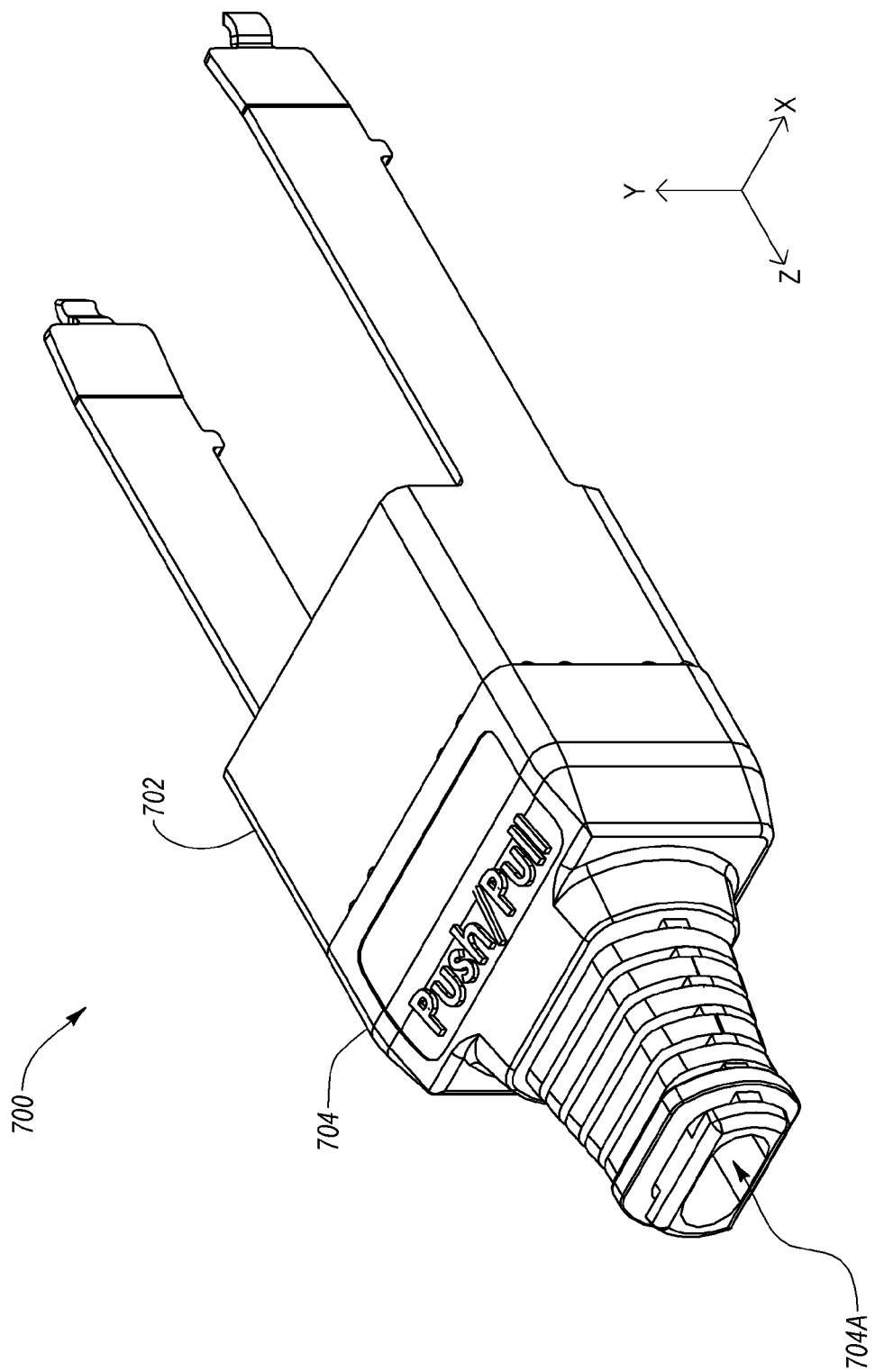
FIG. 7 is a front perspective view of another embodiment of an integrated boot and release slide that can be employed in the communications module of FIGS. 1A-1C.

With additional reference to FIG. 7, another embodiment of an integrated boot and release slide 700 is disclosed that is similar in some respects to the integrated boot and release slide 134 of FIGS. 1A-6 and that can be implemented in the module 100 of FIGS. 1A-1C. As illustrated, the integrated boot and release slide 700 includes a release slide 702 and a boot 704. The release slide 502 is substantially identical to the release slide 136 described above.

The boot 704 is similar in some respects to the boot 138. For instance, the boot 704 may be made of the same materials as the boot 138, includes a main body, is coupled to the release slide 702 by overmolding the boot 704 over coupling structures (not shown) of the release slide 702, and defines a cavity 704A configured to slidably receive a cable. In contrast to the boot 138 of FIGS. 1A-6, however, the boot 704 lacks a handle. Accordingly, the integrated boot and release slide 700 of FIG. 7 is activated by applying a force directly to the main body of the boot 704.

Figure 8A:
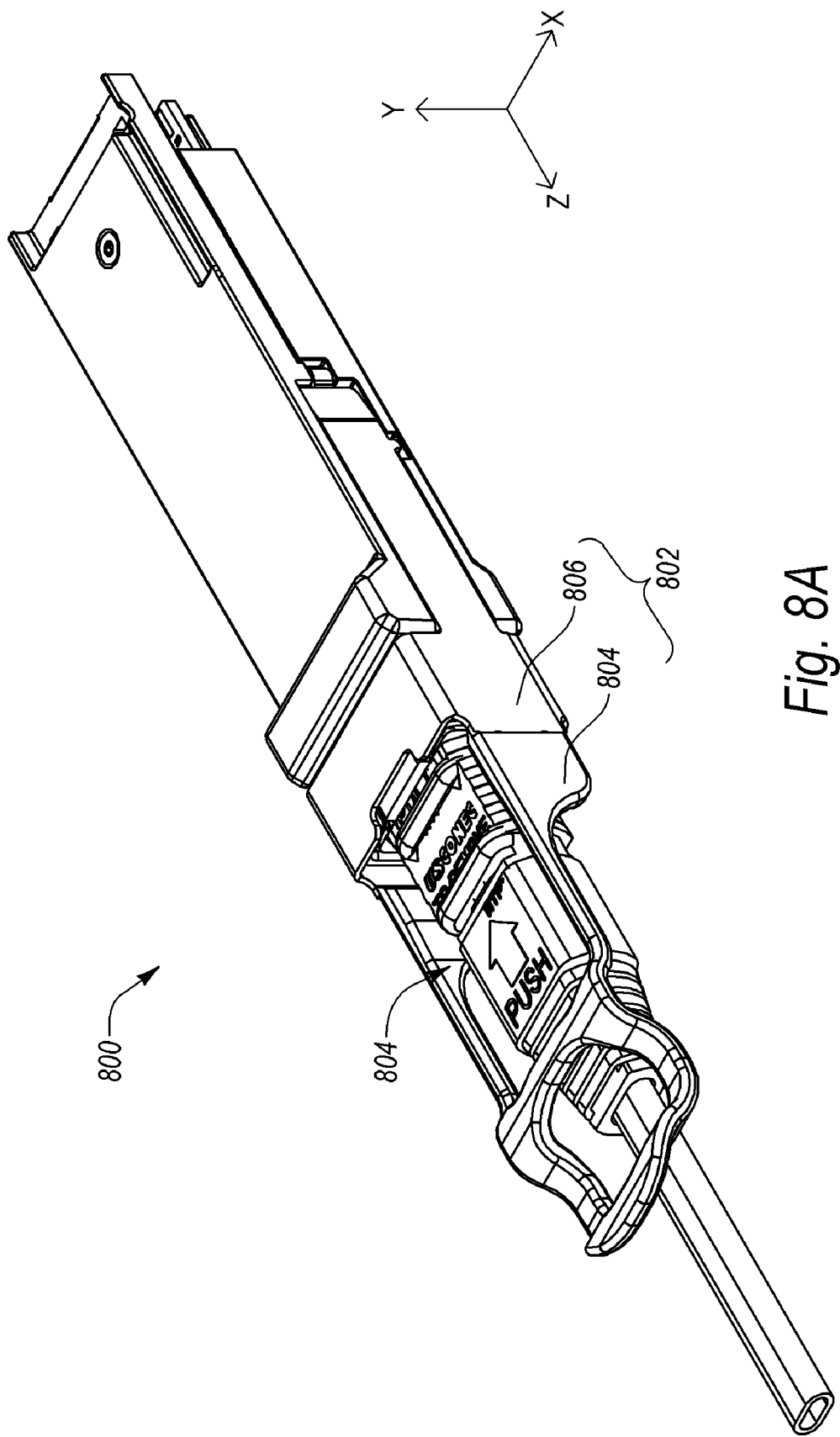
FIG. 8A is front perspective view of another example communications module and an attached communications cable illustrating an example boot and example release slide forming yet another embodiment of an integrated boot and release slide.

Turning to FIG. 8A, a module 800 is disclosed that implements yet another embodiment of an integrated boot and release slide 802. The module 800 is generally similar to the module 100 of FIGS. 1A-1C except for the implementation of a fiber-to-module interface 804 that is different than the fiber-to-module interface (including modified MPO style male connector 122B) of module 100, and the implementation of integrated boot and release slide 802.

Figure 8B:
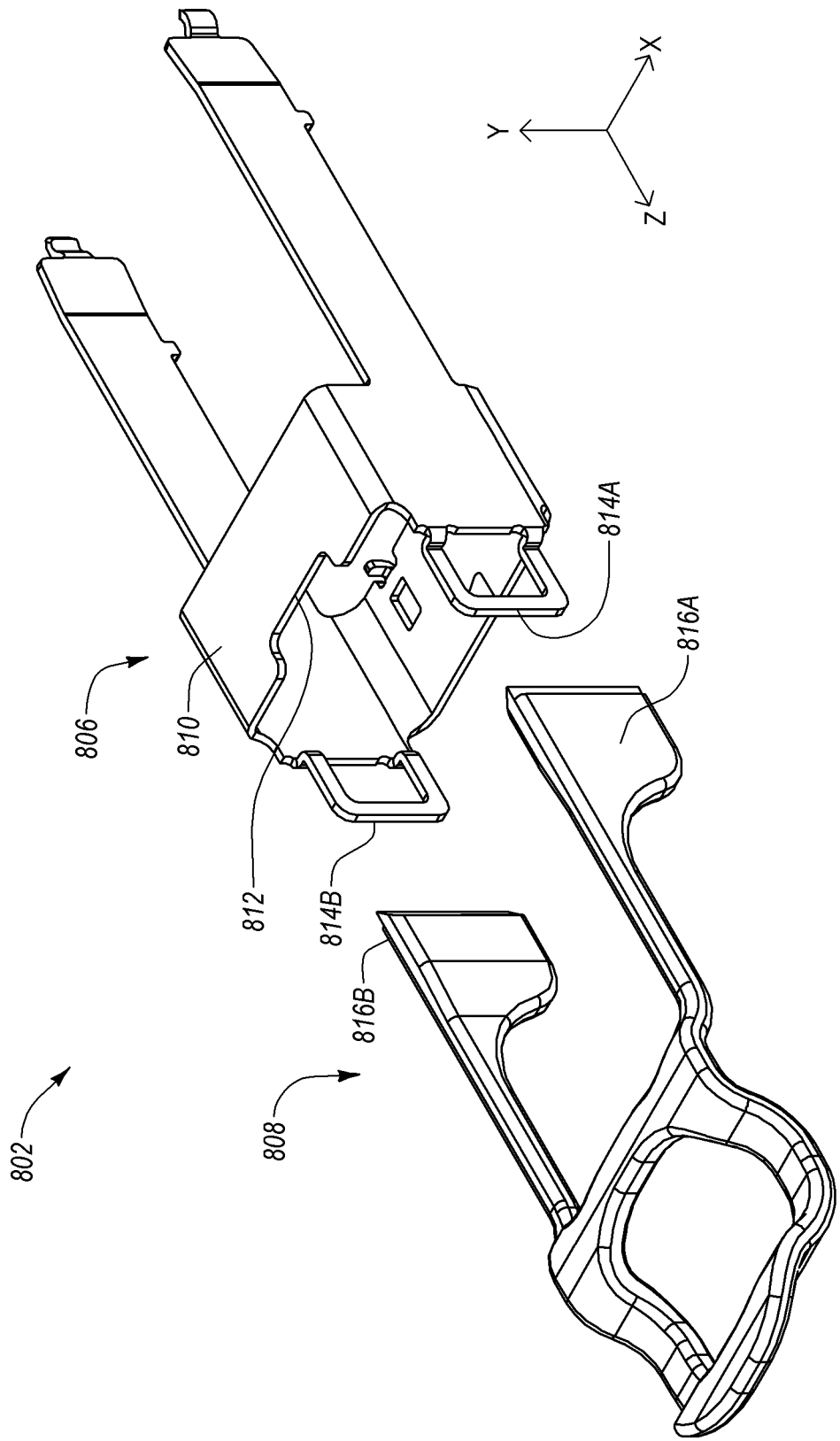
FIG. 8B is an exploded front perspective view of the integrated boot and release slide of FIG. 8A.

FIG. 8B discloses an exploded perspective view of the integrated boot and release slide 802. As illustrated, the integrated boot and release slide 802 includes a release slide 806 and a boot 808. The release slide 806 is generally similar to the release slide 136 of FIGS. 1A-6 except that the release slide 806 includes a main body 810 with a cutout 812 to accommodate the fiber-to-module interface 804 and the release slide 806 only includes two coupling structures 814A, 814B.

The boot 808 is generally similar to the boot 138 of FIGS. 1A-6 except that the release slide lacks a main body. Instead, the boot 808 includes two coupling lobes 816A, 816B configured to be overmolded on the coupling structures 814A, 814B to couple the boot 808 and release slide 806 together.

Figure 9A:
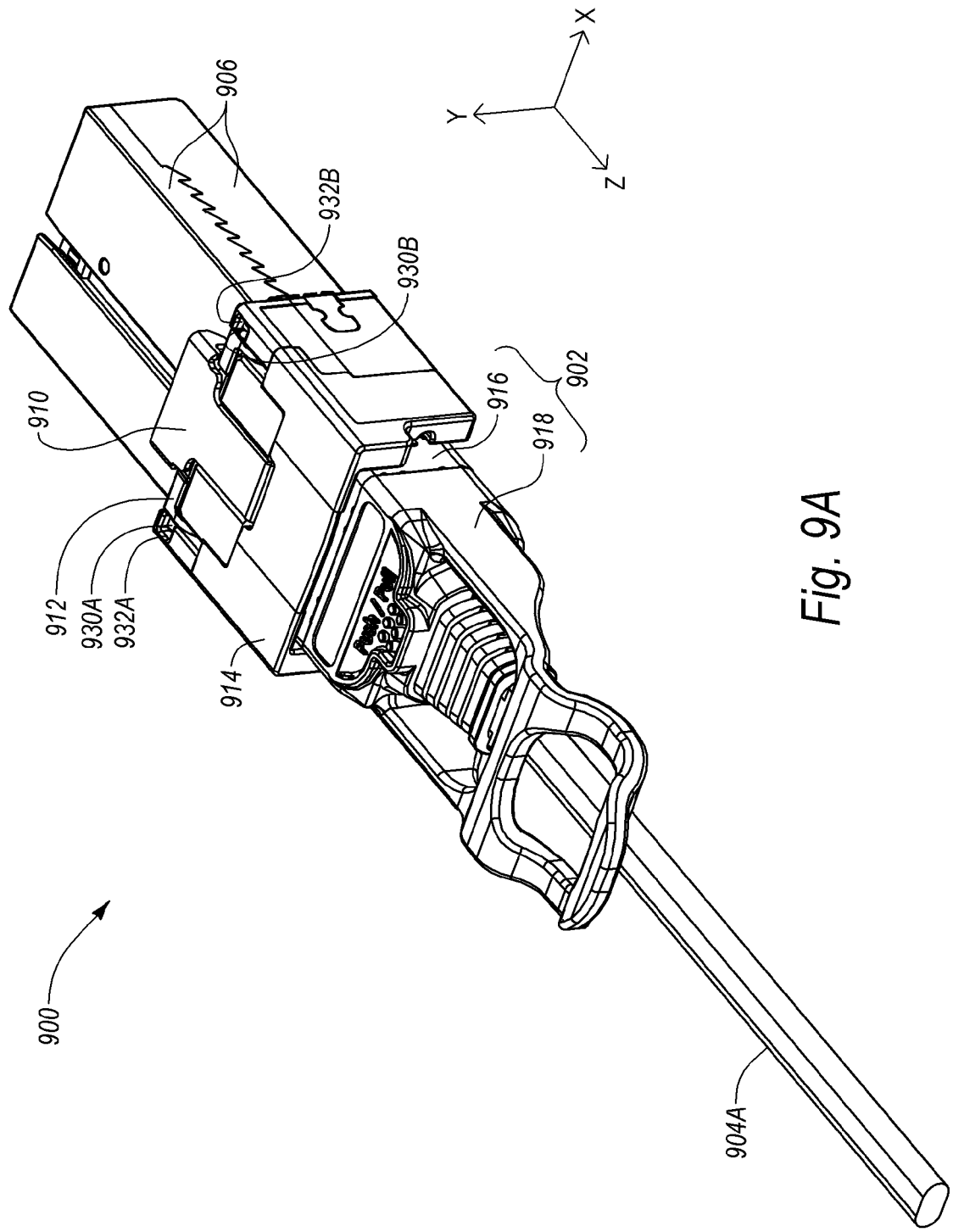
FIG. 9A is front perspective view of yet another example communications module and an attached communications cable illustrating an example boot and example release slide forming yet another embodiment of an integrated boot and release slide.
Figure 9B:
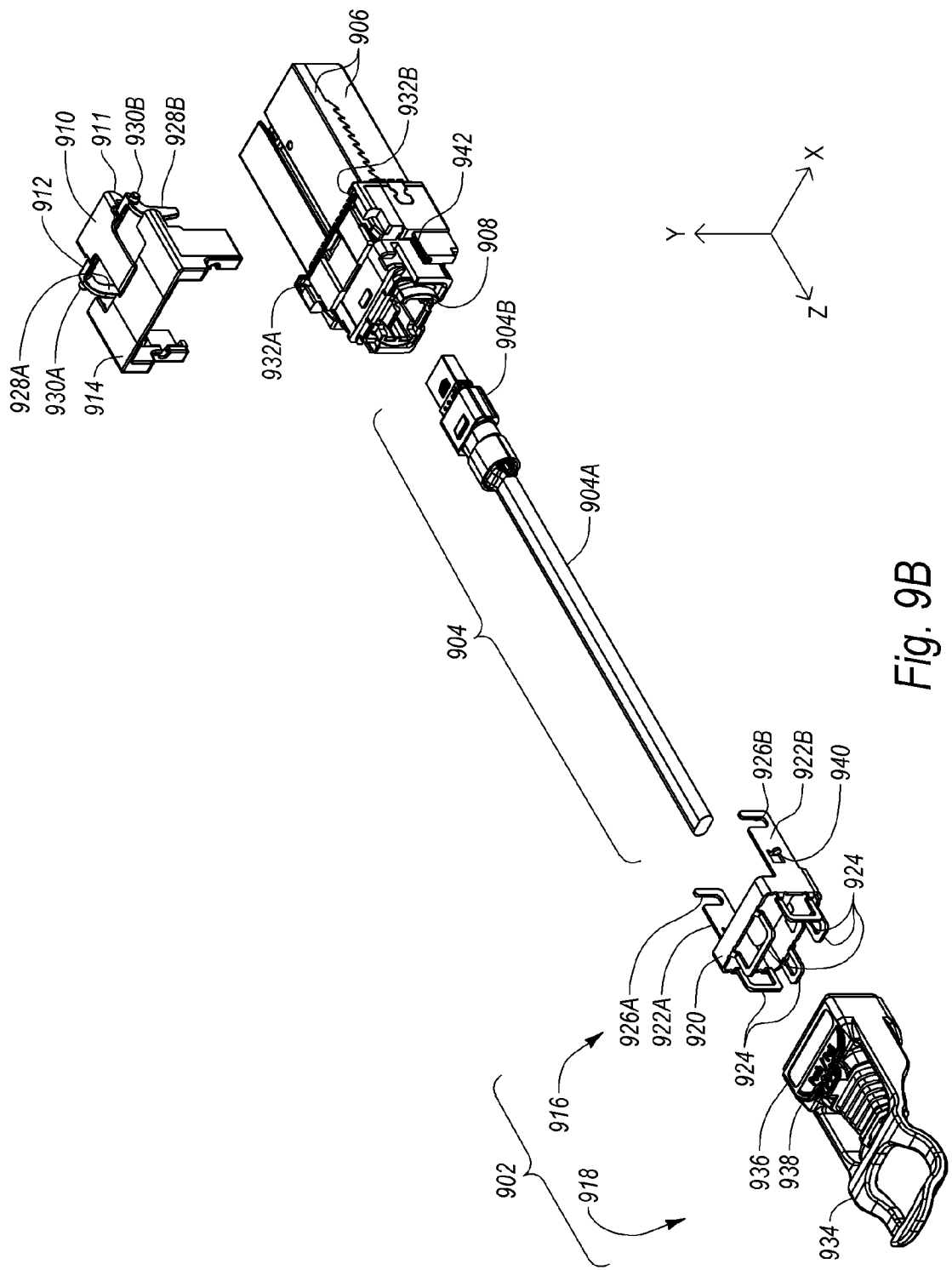
FIG. 9B is an exploded front perspective view of the example communications module and attached communications cable of FIG. 9A.

Referring to FIGS. 9A-9B, a module 900 is disclosed that implements yet another embodiment of an integrated boot and release slide 902. As disclosed in FIG. 9A, the module 900 is permanently attached to a cable assembly 904, and thus the module 900 represents one end of an "active cable" which may include another module (not shown) permanently attached to the other end of the cable assembly 904. Alternately, the other end of the active cable can terminate with a fiber optic connector or the module 900 could instead be configured as a stand-alone module.

The cable assembly 904 includes a communications cable 904A and a modified MPO-style male connector 904B. In some embodiments, the communications cable 904A includes twenty four (24) multimode parallel fibers, with twelve (12) of the fibers being employed to transfer data signals in one direction, and the other twelve (12) fibers being employed to transfer data signals in the opposite direction.

The module 900 can be configured to optical signal transmission at a variety of per-second data rates including, but not limited to, 150 G or higher. In addition, although the example module 900 is configured to be substantially compliant with the CXP MSA, the module 900 can instead be configured to assume a variety of different form factors that are substantially compliant with various transceiver and/or transponder MSAs including, but not limited to, SFF, SFP, XFP, XPAK, X2, XENPAK or QSFP.

The module 900 includes a housing 906 and various other components analogous to those disclosed above with respect to the module 100 of FIGS. 1A-1C. In particular, the module 900 includes one or more optical transmitters (not shown), one or more optical receivers (not shown), a PCBA, laser driver, post amplifier, and the like. The module 900 additionally includes an alignment guide 908 to receive the MPO-style male connector 904B.

The latching mechanism employed to selectively secure the module 900 within a cage is different than the latching mechanism of the module 100. In particular, the module 900 includes a latch 910 that is configured to engage at least one recess in the cage. The latch 910 includes latch hooks 911 (only one is shown in FIGS. 9A-9B) and is disposed above a cam 912. A retaining cover 914 secures the latch 910 to the module 900. The integrated boot and release slide 902, including release slide 916 and boot 918, activates the latch 910.

The release slide 902 is similar in some respects to the release slide 136 of FIGS. 1A-6. For instance, the release slide 902 includes a main body 920 with a plurality of arms 922A, 922B (collectively "arms 922") extending from one side of the main body 920, and a plurality of coupling structures 924 extending from the other side of the main body 920. The couplings structures 924 are configured to be overmolded by the boot 918 to couple the boot 918 and release slide 916 together.

In contrast to the release slide 136, however, the arms 922 include cutouts 926A, 926B (collectively "cutouts 926") formed therein. The cutouts 926A are configured to receive cam legs 928A, 928B (collectively "cam legs 928") of the cam 912. The cam 912 is configured to pivot about an axis defined by pivot posts 930A, 930B (collectively "pivot posts 930") formed on the cam 912 and corresponding pivot slots 932A, 932B (collectively "pivot slots 932") formed in the housing 906.

The boot 918 is similar to the boot 138 of FIGS. 1A-6.

In operation, the latch 910 is activated by exerting a force having a positive z-component on the integrated boot and release slide 902. Generally, the force is applied to a handle 934, main body 936, and/or gripping portion 938 of the boot 918. As the integrated boot and release slide 902 moves in the z-direction, the cutouts 926 engage cam legs 928 and cause the cam 912 to rotate about the axis defined by pivot posts 930 and pivot slots 932. The rotation of the cam 912 about the axis displaces the end of the latch 910 with the latch hooks 911 upwards to disengage the latch hooks 911 of the latch 910 from corresponding recesses formed in the cage (not shown). The retaining cover 914 flexes to accommodate the displacement of the latch 910 and is at least partially resilient so as to restore the latch 910, cam 912 and integrated boot and release slide 902 to a non-activated position.

Alternately or additionally, the release slide 916 includes a plurality of tabs 940 (only one tab 940 is visible in FIG. 9B) formed in the arms 922. The tabs 940 cooperate with the housing 906 and retaining cover 914 to confine springs 942 (only one spring 942 is visible in FIG. 9B). The springs 942 are configured to bias the integrated boot and release slide 902 to the non-activated position. For instance, when the integrated boot and release slide 902 is activated by applying a force to move the integrated boot and release slide 902 in the positive z-direction, the tabs 940 are configured to compress the springs 942 against the retaining cover 914. When the force is removed, the compressed springs 942 expand against the tabs 940 and retaining cover 914 to return the integrated boot and release slide 902 to a non-activated position.

Additional details regarding the module 900 are disclosed in U.S. patent application Ser. No. 12/573,637.

Figure 10:
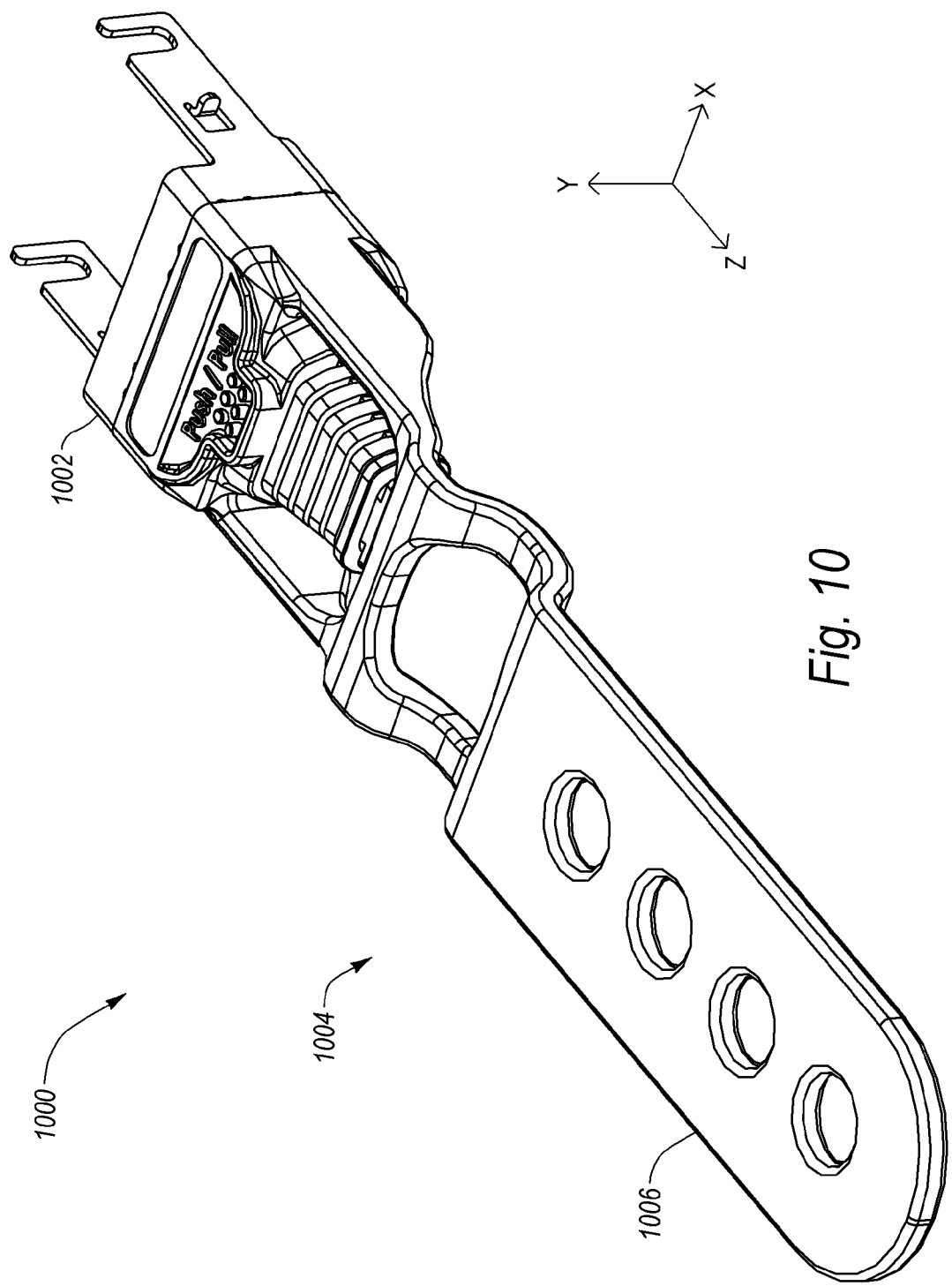
FIG. 10 is a front perspective view of another embodiment of an integrated boot and release slide that can be employed in the communications module of FIG. 9A.

With additional reference to FIG. 10, another embodiment of an integrated boot and release slide 1000 is disclosed that is similar in some respects to the integrated boot and release slide 902 of FIGS. 9A-9B and that can be implemented in the module 900 of FIGS. 9A-9B. As illustrated, the integrated boot and release slide 1000 includes a release slide 1002 and a boot 1004. The release slide 1004 is substantially identical to the release slide 916 described above.

The boot 1004 is similar in some respects to the boot 918 of FIGS. 9A-9B. In contrast to the boot 918, however, the boot 1004 includes an extended handle 1006 with a plurality of holes formed therein.

It will be appreciated, with the benefit of the present disclosure, that the embodiments disclosed herein are not mutually exclusive and can be substituted or combined in various manners. Further, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An integrated boot and release slide for a communications module, the integrated boot and release slide comprising:
    a release slide, the release slide including:
        a main body;
        a plurality of arms extending from a first end of the main body; and
        a plurality of coupling structures extending from a second end of the main body opposite the first end; and
        a boot overmolded over the plurality of coupling structures of the release slide, the boot defining a cavity configured to slidably receive a communications cable.

2. The integrated boot and release slide of claim 1, wherein the release slide further includes a plurality of tabs configured to engage a plurality of springs of a communications module to bias the integrated boot and release slide in a non-activated position.

3. The integrated boot and release slide of claim 1, wherein the release slide comprises sheet metal.

4. The integrated boot and release slide of claim 1, wherein the main body comprises a hollow cylinder substantially enclosing at least a portion of one end of a housing of the module, the hollow cylinder having a substantially rectangular cross-section.

5. The integrated boot and release slide of claim 1, wherein the plurality of coupling structures includes five substantially U-shaped coupling structures.

6. The integrated boot and release slide of claim 1, wherein the plurality of coupling structures includes two substantially U-shaped coupling structures.

7. The integrated boot and release slide of claim 1, wherein the boot includes a main body overmolded over the plurality of coupling structures.

8. The integrated boot and release slide of claim 1, wherein the boot includes a handle extending from the main body.

9. The integrated boot and release slide of claim 1, wherein the boot includes a plurality of coupling lobes overmolded over the plurality of coupling structures.

10. The integrated boot and release slide of claim 1, wherein the boot comprises rubber.

11. A communications module comprising:
    a housing comprising a top shell and a bottom shell; and
    an integrated boot and release slide, the integrated boot and release slide comprising:

a release slide, the release slide including:
    a main body comprising a hollow cylinder substantially enclosing at least a portion of one end of the bottom shell, the hollow cylinder having a substantially rectangular cross-section;
    a plurality of arms extending from a first end of the main body along opposing sides of the housing; and
    a plurality of coupling structures extending from a second end of the main body opposite the first end of the main body; and
    a boot overmolded over the plurality of coupling structures of the release slide, the boot defining a cavity configured to slidably receive a communications cable.

12. The communications module of claim 11, wherein the housing includes at least one shoulder formed on each of the opposing sides of the housing and each of the plurality of arms includes a ramp and a de-latch member positioned near a corresponding at least one shoulder.

13. The communications module of claim 12, wherein the ramps are configured to accommodate inward-directed latches of a cage that are operable to engage the at least one shoulders, and wherein the de-latch members are configured to displace the latches so as to disengage the latches from the at least one shoulders.

14. The communications module of claim 11, wherein the housing includes a plurality of pivot slots and each of the plurality of arms of the release slide includes a cutout, the communications module further comprising:
    a cam including two pivot posts configured to be received within the pivot slots and that define an axis of rotation with the pivot slots, the cam further including a plurality of cam legs that each extend in a direction substantially normal to the axis of rotation, each cam leg configured to be received by a corresponding cutout of the plurality of arms of the release slide;
    a latch having a first end and a second end with the first end positioned above the cam, the first end configured to be displaced by the cam when the cam is rotated about the axis of rotation; and
    a retaining cover configured to secure the latch to the communications module.

15. The communications module of claim 11, wherein the communications module is substantially compliant with the QSFP MSA or the CXP MSA.

16. An active cable comprising:
    a communications cable comprising one or more optical fibers, the communications cable having first and second ends; and
    first and second communications modules attached to the first and second ends of the communications cable, respectively, each communications module comprising:
    a housing comprising a top shell and a bottom shell;
    an integrated boot and release slide, the integrated boot and release slide comprising:
        a release slide, the release slide including:
            a main body including a hollow cylinder substantially enclosing at least a portion of one end of the bottom shell, the hollow cylinder having a substantially rectangular cross-section;
            a plurality of arms extending from a first end of the main body along opposing sides of the housing; and
            a plurality of coupling structures extending from a second end of the main body opposite the first end of the main body; and
        a boot overmolded over the plurality of coupling structures of the release slide, the boot defining a cavity configured to slidably receive the communications cable.

17. The active cable of claim 16, wherein the cavity permits the boot to travel back and forth along a portion of the communications cable.

18. The active cable of claim 16, further comprising a plurality of springs, each disposed in a corresponding channel of the housing and configured to engage a corresponding tab formed in the release slide so as to bias the integrated boot and release slide in a non-activated position.

19. The active cable of claim 16, wherein each communications module is substantially compliant with the QSFP MSA or the CXP MSA.

20. The active cable of claim 16, wherein the communications cable comprises twelve optical fibers or twenty four optical fibers.

* * * * *